United States Patent [19]

Ferguson

[11] Patent Number: 5,072,101

[45] Date of Patent: Dec. 10, 1991

[54] COMPUTER SECURITY SYSTEM WITH KEY-RECEIVING SOCKET

[75] Inventor: Terry T. Ferguson, Manassas, Va.

[73] Assignee: Cynthia A. Ferguson, Germantown, Md.

[21] Appl. No.: 520,889

[22] Filed: May 9, 1990

Related U.S. Application Data

[63] Continuation of Ser. No. 15,578, Feb. 18, 1987, Pat. No. 4,937,437, which is a continuation of Ser. No. 640,901, Aug. 15, 1984, abandoned, which is a continuation of Ser. No. 390,647, Jun. 21, 1982, abandoned.

[51] Int. Cl.$^5$ .............................................. G06K 7/06

[52] U.S. Cl. .................................... 235/441; 235/382; 235/492

[58] Field of Search ............... 235/441, 492, 443, 382; 340/825.5

[56] References Cited

U.S. PATENT DOCUMENTS 4,297,569 10/1981 Flies .................................. 235/443

4,449,775 5/1984 de Pommery et al. ......... 235/441 X 4,937,437 6/1990 Ferguson ........................ 235/492 X

*Primary Examiner*—David Trafton

*Attorney, Agent, or Firm*—Beveridge, DeGrandi & Weilacher

[57] ABSTRACT

A security system is provided for controlling access to information stored in a target memory in which an access key carries a random access binary memory which is electronically programmable, electronically alterable, directly electronically readable and non-volatile. The memory carried on the key constitutes an integral portion of the target system memory when the key is inserted into a receptacle. The receptacle has a zero insertion force socket to reduce wear and provide direct electrical connection. The key may have an extremely wide variety of coded information programmed into it; when the key is removed from the receptacle, the target system will not operate correctly since a portion of its memory is effectively missing. The system may be retrofitted into existing target systems or incorporated in future target systems.

2 Claims, 3 Drawing Sheets

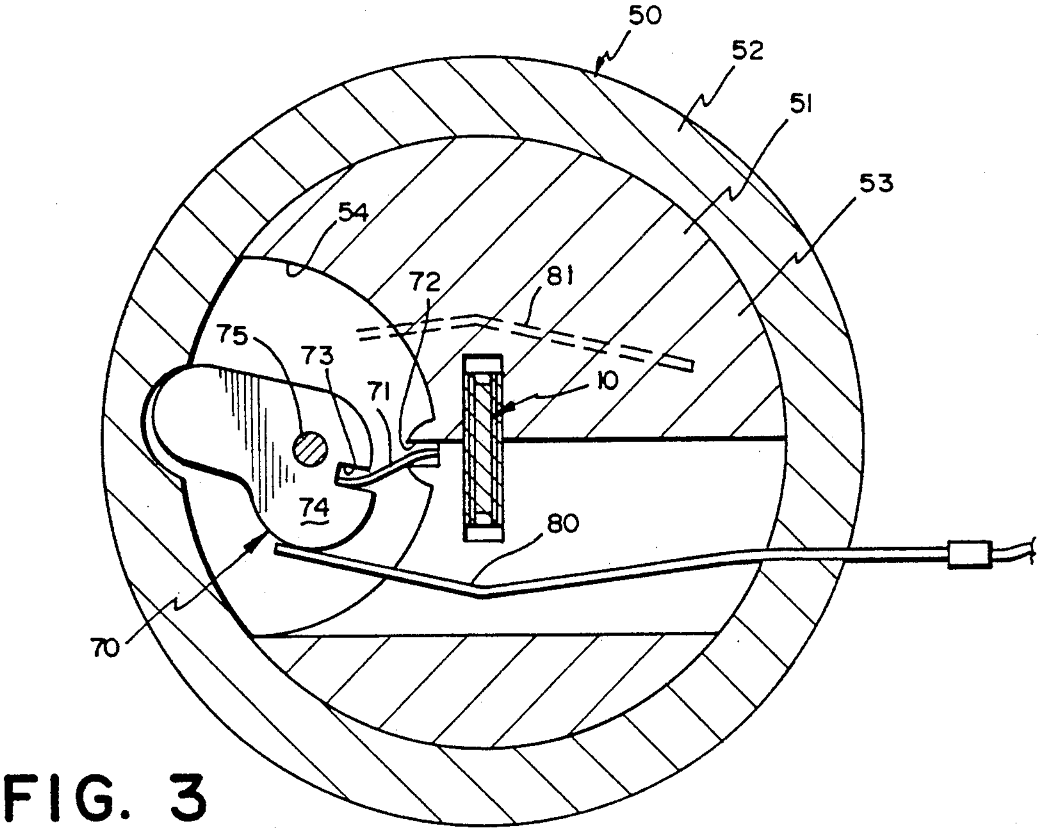
FIG. 3
FIG. 4
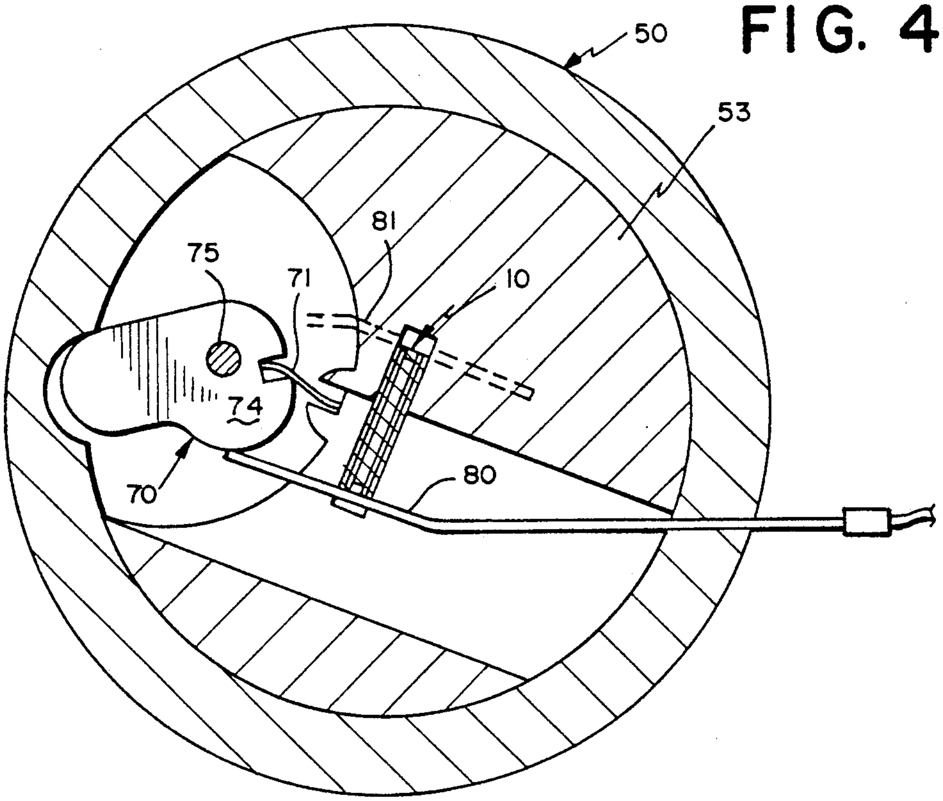

COMPUTER SECURITY SYSTEM WITH KEY-RECEIVING SOCKET

REFERENCE TO RELATED APPLICATIONS

This is a continuation of application Ser. No. 07/015,578, filed Feb. 18, 1987, now U.S. Pat. No. 4,937,437 which was a continuation of abandoned application Ser. No. 06/640,901 filed Aug. 15, 1984, which in turn was a continuation of abandoned application Ser. No. 06/390,647 filed June 21, 1982.

FIELD OF THE INVENTION

The invention relates to an apparatus to restrict and to control access to sensitive information typically stored in computer memory. The invention incorporates a key and receptacle wherein the key contains a significant portion of the target system memory. When the key is removed from the socket, the target system is unable to operate correctly since a portion of its memory has been effectively removed.

BACKGROUND OF THE INVENTION

It is known in the art to provide various security systems for restricting and controlling access to sensitive information stored in electronic equipment.

One such example of prior art is the key apparatus of U.S. Pat. No. 4,298,792. In that system, which is typical of the prior art, the information required to open the lock is contained in a memory, for example a digital PROM located within the machine (see column 3, lines 4–6).

The key system of U.S. Pat. No. 4,200,227 generates a signal which, if recognized by the target system, authorizes access.

A generally similar system is shown in U.S. Pat. No. 4,120,452 in which a memory holder is inserted into the target system but in which the memory holder is primarily an accounting device. Removing the memory holder from the machine does not disable the target machine by removing a portion of the target system memory.

OBJECT AND SUMMARY OF THE INVENTION

It is a principal object of the present invention to provide a security system for information stored in a target system memory in which a portion of the target system memory is effectively removed between periods of authorized use. It is virtually impossible to gain unauthorized access to information in the target system during periods in which a portion of target system memory has been removed.

A further object of the invention is to provide a security system for restricting access to information stored in computer memory which can be retrofitted into an existing device having a prior art security system, without lessening the integrity of the original equipment.

A further object of the invention is to provide a very powerful security system in the form and appearance of an innocent, ordinary key and receptacle.

It is a further object of the invention to provide a key and receptacle in which there is very little, if any, physical wear and tear between the significant electrical contact points on the key and receptacle.

Another object of the invention is to provide a security system in which the key has relatively great lateral strength by being formed with a silicon substrate.

A further object of the invention is to provide an exceptionally fast operational read access time.

A further object of the invention is to incorporate a standard, general industry available, random access binary memory on a key which is electronically programmable, electronically alterable, directly electronically readable and nonvolatile.

A further object of the invention is to provide a security system capable of emulating existing electronic memories to facilitate the retrofitting of existing security systems with the security system of the present invention.

A further object of the invention is to provide a security system which protects against surreptitious electronic intercept of sensitive information contained within said key.

A further object of the invention is to provide a security device in which the access key contains a very large data storage capability.

A further object is to provide a security system which is protected against static electricity.

The invention will be better understood, as well as further objects and advantages become more apparent, from the ensuing detailed description of preferred embodiments taken in conjunction with the drawings.

BRIEF DESCRIPTION OF THE DRAWINGS

FIG. 3 is a sectional view of the interior of the receptacle;

FIG. 4 is a sectional view of the receptacle of FIG. 3 shown in its alternate position.

DETAILED DESCRIPTION OF THE PREFERRED EMBODIMENTS

Figures 1, 2:
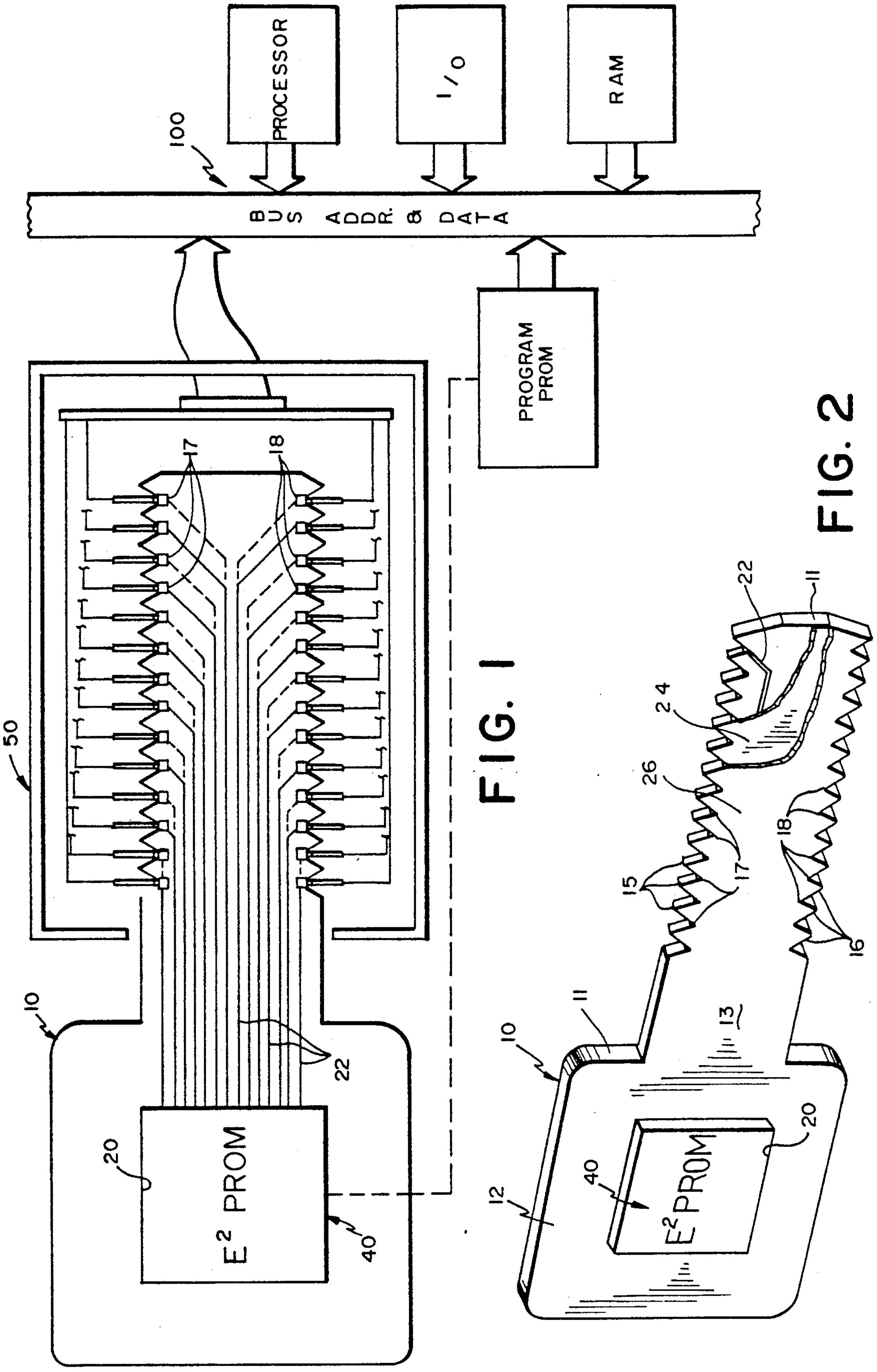
FIG. 1 is a schematic representation of the security system showing the key and its receptacle.
FIG. 2 is a perspective view of the key shown apart from the receptacle.

FIGS. 1 and 2 illustrate the key means shown generally as 10, receptacle means 50 and the target system 100. An important feature of the invention is that key means 10 carries a random direct access binary memory means 40 which is electronically programmable, electronically alterable, electronically readable and nonvolatile ($E^2$PROM). A Hitachi HN 48016 may be used as memory means 40. Memory means 40 constitutes an integral portion of the target system memory when key means 10 is inserted into receptacle means 50. When the key means 10 is removed from the receptacle means 50, target system 100 will not operate correctly since a large portion of its memory is effectively missing.

Referring to FIG. 2, key means 10 comprises a ceramic substrate 11 formed generally in the shape of an ordinary key with a head 12 and a notched shaft 13. As shown in FIG. 2, the key means 10 contains notches 15 and 16 formed on both edges of shaft 13. It is to be understood that the key could be made with notches on one edge of shaft 13 but not on the opposite edge.

Conductive contact points 17 and 18 are placed in the base of notches 15 and 16 respectively. Recess 20 is formed in the head portion 12 to receive the random access binary memory means 40. Conductive traces 22 connect contact points 17 and 18 with recess 20.

A porcelain layer 24 is applied over the ceramic substrate 11 except at contact points 17 and 18. A metallic plating 26 is applied over the porcelain layer 24 and gives the key means 10 the appearance of an ordinary metallic key. The metallic layer 26 additionally keeps problems of static electricity to a minimum.

Key means 10 effectively allows critical parameters normally in PROM or ROM firmware to be in an easily removable, easily installed, controlled and transported data storage media which actually appears to have the function of a common key. The key means 10, in effect, replaces the internal PROMs now in use. Data is electronically read by the host at the host's speed, up to 400 nanoseconds; the key means 10 literally and actually is presented to the host or target system as the target's own internal PROM memory. The key means 10 is reprogrammable with the programmer; the key contains 16,384 bits of information through hybrid technology, which is capable of emulating any type of PROM up to 16,384 bits. With normal usage, the memory means 40 has a tolerance of $10^9$ read accesses between writes and $10^6$ erase/write cycles. Data stored in memory means 40 may be written, read, or updated in whole or in part when the key is inserted into receptacle means 50. The overall design of the key means 10 and receptacle means 50 prevents EMI/RFI radiation of the data within the key during operation to minimize electronic radiation as required by FCC and VDE specifications and to conform to government TEMPEST standards.

The storage capacity of memory means 40 of 16,384 reprogrammable bits provides $2^{16384}$ possible combinations. Even if an unauthorized person were to obtain a key and try various combinations on a terminal designed or modified for use with the system of this invention; even if the change and try of combinations, response, acceptance or rejection occurs one million times per second, it would still take over $10^{2000}$ years (average) just to gain access. The key means 10 contains very large personalized individual codes (50 to 100 characters) which upon computer or terminal match allows access to the main system. The key can also contain a significant portion of the terminal firmware, without which not even the terminal will operate properly.

Consider if the key means 10 were lost or duplicated. If lost, the key means 10 does have some valid code—but the finder would have no way of knowing to what terminal the key would apply. The issuing organization simply reprograms a new key, changes the terminal or CPU access codes to unused combinations, and forgets the lost key.

FIGS. 3 and 4 show receptacle means 50. A "zero insertion force socket" 51 is formed by cylinder 52 and recessed barrel 53. An arcuate recess 54 is formed in barrel 53 to allow for the operation of cam means 70. Upon rotation of the key in the clockwise direction as shown in FIG. 4, barrel 53 is rotated as shown. Cam means 70 moves in response to rotation of barrel 53. Leaf spring 71 is mounted between recess 72 in barrel 53 and recess 73 formed in cam 74. As cam 74 rotates about its mounting shaft 75 spring loaded electrical contact 80, which rides on cam 74, is brought into contact with key means 10 as shown in FIG. 4. This design effectively eliminates wear of the electrical contacts 80 and electrical contact points 17 and 18 on key means 10. FIG. 4 shows in phantom an additional spring loaded contact 81 which is utilized if key means 10 is designed to have contact points on both edges of shaft 13. (Please see FIG. 2.)

Figure 5:
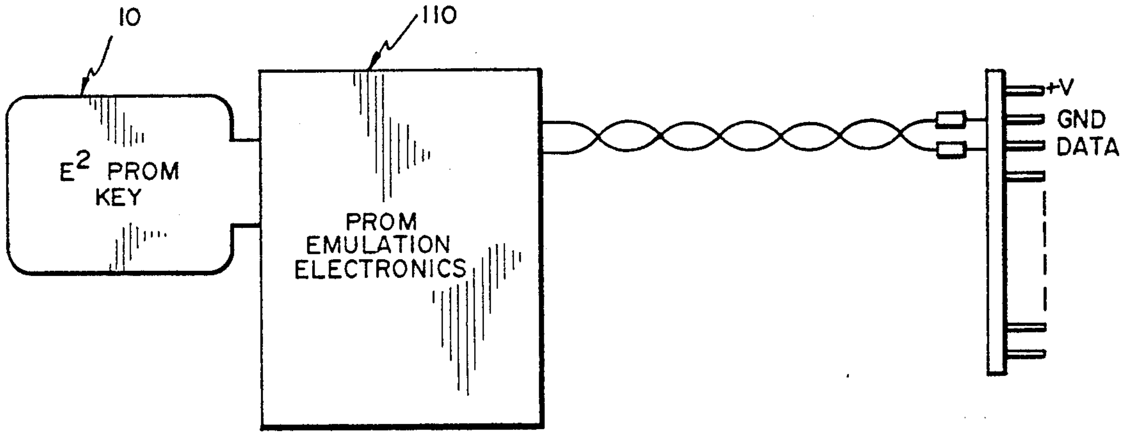
FIG. 5 is a schematic representation of the emulation electronics of the present system.

FIG. 5 shows schematically the emulation means 110. The use of emulation means 110 allows existing systems to be retrofitted with the system of this invention. As represented in FIG. 5, key means 10 (shown as "$E^2$-PROM key") is electrically programmed with the identical data as in an existing PROM. The PROM emulation electronics logic array converts the address area of the EPROM to the $E^2$PROM and, when read, operates in reverse. Due to the large data capacity of the key means 10, any known 16k bit or less EPROM or ROM may be emulated, often simply by making the appropriate cross-wire interconnects. Thus, address bit 1 of the EPROM socket is wired to address bit 1 of the key means 10. Address wiring is similarly accomplished for bit 2 to address bit 2, etc. The same occurs with the data bits. Unused address bits are tied off to the appropriate logic level. Power and ground is also taken from the host to the key means.

In a transliteration code, the bit representation of ASCII letter A is mapped through the EPROM which may put out another bit pattern, say the ASCII letter Y. This is accomplished through a look-up table, adds, compares, subtracts, etc. In any case, a bit (or series of bits) is read from an addressed memory cell where the address of the cell depends upon what bit pattern has arrived to be translated.

All the security key does is to remote the above function. This is similar to extending a computer bus by cable.

I claim:

1. A computer device, comprising, a key means which is directly connectable electronically to a target computer system, receptacle means receiving said key means, binary memory means carried by said key means, said binary memory means being electronically programmable, electronically alterable and directly electronically readable when connected directly to a target computer system, said receptacle means including a zero insertion force socket assembly including a rotatable member which has a recess formed therein for receiving a longitudinally inserted key means, said assembly being provided with spring loaded electrical contacts for making electrical contact with said key means, said electrical contacts being normally spaced from said recess to permit the key means to be fully inserted longitudinally into the recess without being contacted by said electrical contacts, contact-moving means carried in said socket which moves in response to rotation of said rotatable member and said key means in said socket assembly and, in response to such movement, is operable to bring said spring loaded electrical contacts into contact with said key means.

2. Apparatus according to claim 1 wherein the contact-moving means includes a cam means which moves in response to rotation of said rotatable member, said spring loaded electrical contacts riding on said cam means.

* * * * *